United States Patent
Bietzer et al.

[11] Patent Number: 5,975,320
[45] Date of Patent: Nov. 2, 1999

[54] TAMPER-EVIDENT CLOSURES AND CONTAINER NECK THEREFOR

[75] Inventors: Steven H. Bietzer; Kurt Krischke, both of Sunnyvale; Daniel Luch, Morgan Hill; Richard E. Repp, San Jose, all of Calif.

[73] Assignee: Portola Packaging, Inc., San Jose, Calif.

[21] Appl. No.: 08/853,669

[22] Filed: May 9, 1997

Related U.S. Application Data

[63] Continuation-in-part of application No. 08/329,210, Oct. 26, 1994, Pat. No. 5,630,520, which is a continuation-in-part of application No. 08/029,177, Mar. 10, 1993, Pat. No. 5,456, 376, which is a continuation-in-part of application No. 07/830,133, Jan. 31, 1992, Pat. No. 5,267,661, which is a continuation-in-part of application No. 07/772,945, Oct. 8, 1991, Pat. No. 5,213,224, which is a continuation-in-part of application No. 07/565,638, Aug. 9, 1990, Pat. No. 5,190, 178.

[51] Int. Cl.⁶ .................................................. B65D 39/00
[52] U.S. Cl. ........................................... 215/254; 215/256
[58] Field of Search ..................... 215/253, 254, 215/256

[56] References Cited

U.S. PATENT DOCUMENTS

| | | | |
|---|---|---|---|
| 3,163,308 | 12/1964 | Friedell | 215/254 |
| 3,784,038 | 1/1974 | Uhlig . | |
| 3,963,140 | 6/1976 | Harding | 215/254 |
| 3,974,931 | 8/1976 | Moller | 215/254 |
| 4,003,488 | 1/1977 | Moller | 215/254 |
| 4,037,748 | 7/1977 | Stubbs, Jr. . | |
| 4,296,871 | 10/1981 | Andersson . | |
| 4,305,517 | 12/1981 | Dennis . | |
| 4,402,451 | 9/1983 | Woerz et al. . | |
| 4,496,066 | 1/1985 | Bullock, III . | |
| 4,522,308 | 6/1985 | Sullivan | 215/253 |
| 4,605,138 | 8/1986 | Taragna et al. | 215/254 |
| 4,699,285 | 10/1987 | Perne et al. . | |
| 4,828,128 | 5/1989 | Tackles . | |
| 4,844,268 | 7/1989 | Bullock, III . | |
| 5,224,616 | 7/1993 | Crisci . | |
| 5,284,265 | 2/1994 | Crisci | 215/256 |
| 5,383,558 | 1/1995 | Wilkinson et al. . | |

FOREIGN PATENT DOCUMENTS 2103909  3/1983  United Kingdom .

*Primary Examiner*—Stephen K. Cronin
*Attorney, Agent, or Firm*—Julian Caplan; Flehr Hohbach Test; Albritton & Herbert LLP

[57] ABSTRACT

A tamper-evident closure and container neck. The closure has a top and a skirt depending from the top having at least one engagement member on the interior of the skirt which cooperates with at least one engagement member on the neck to retain the closure on the container neck. The closure includes a tab to facilitate removal of the closure from the container neck. The tab includes a longitudinal axis and wall portions extending outwardly from the axis and terminating in a plane spaced from the longitudinal axis for reinforcing the tab. Frangible sections prevent removal of the cap from the neck so long as the frangible sections are intact.

26 Claims, 6 Drawing Sheets

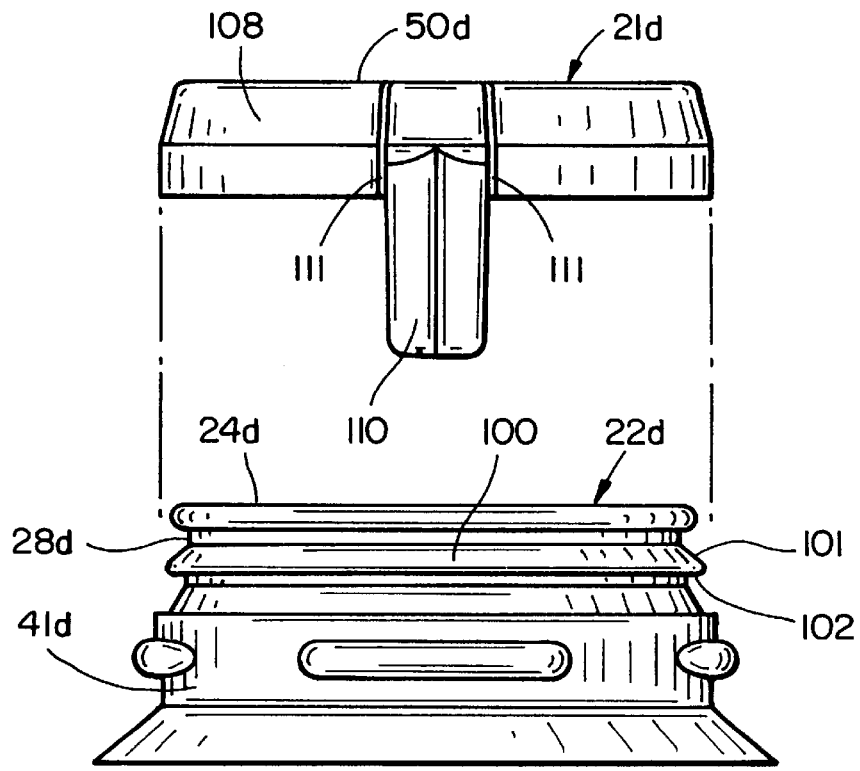
FIG_11
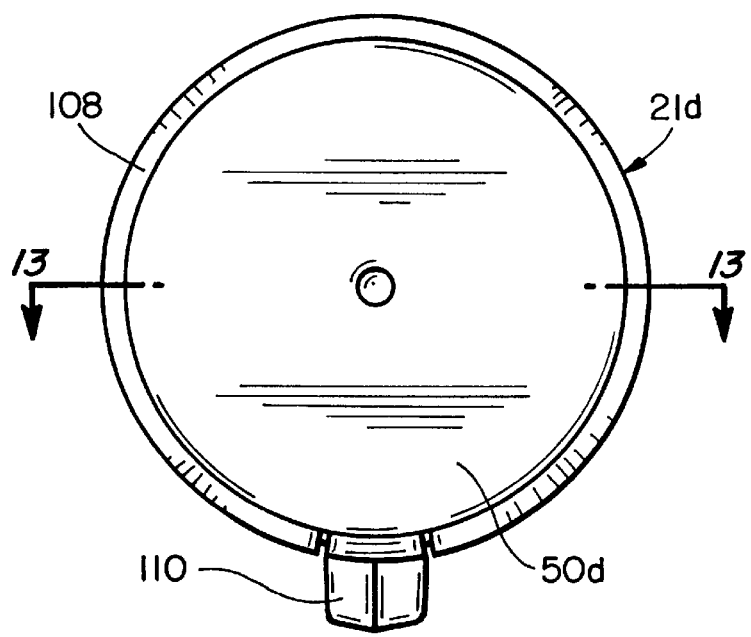
FIG_12

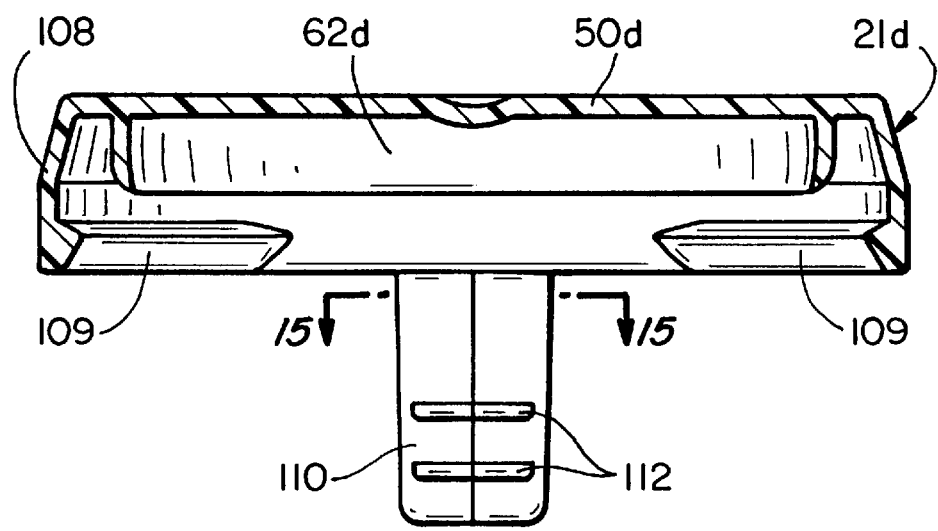
FIG_13
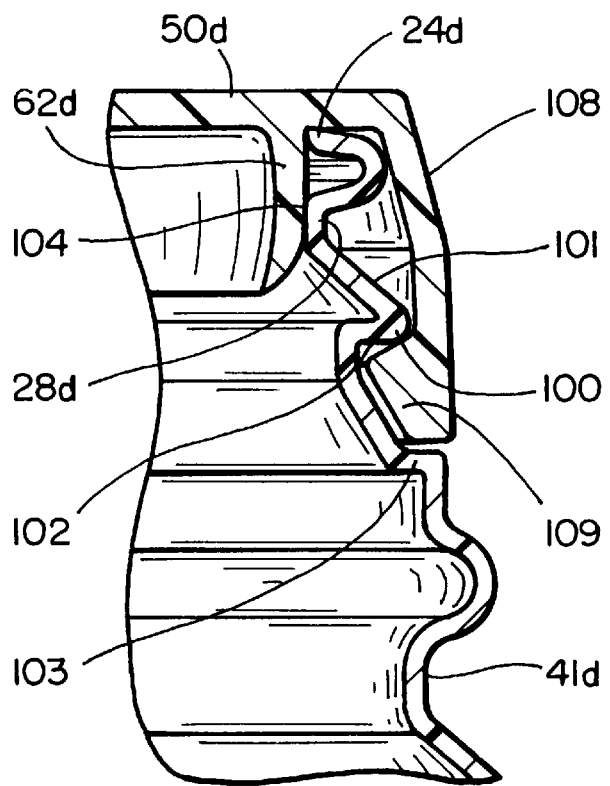
FIG_14

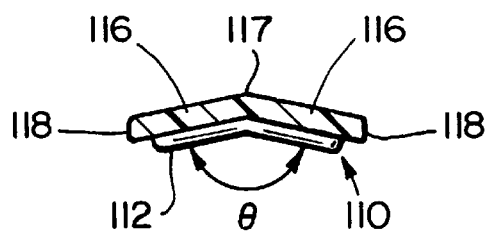
FIG_15
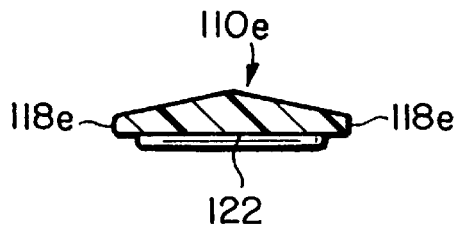
FIG_16
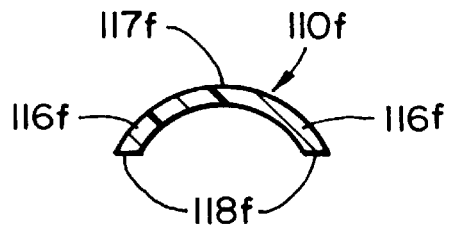
FIG_17
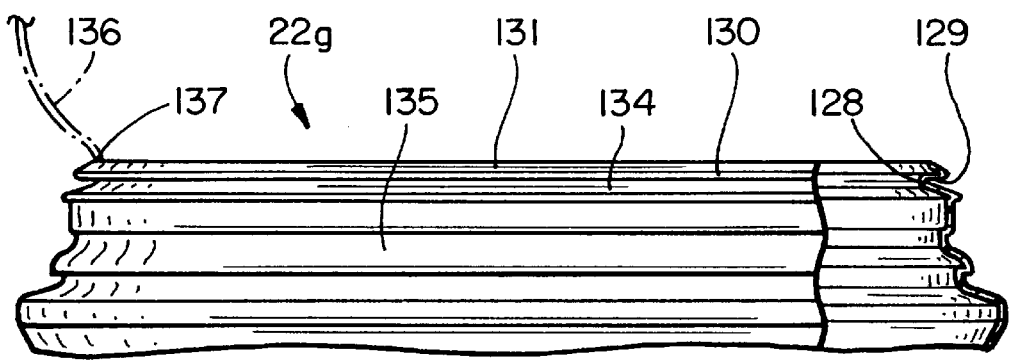
FIG_18

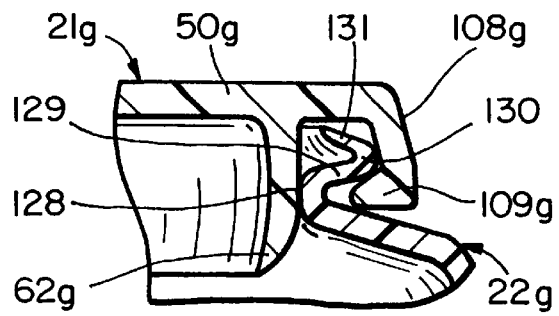
FIG_19
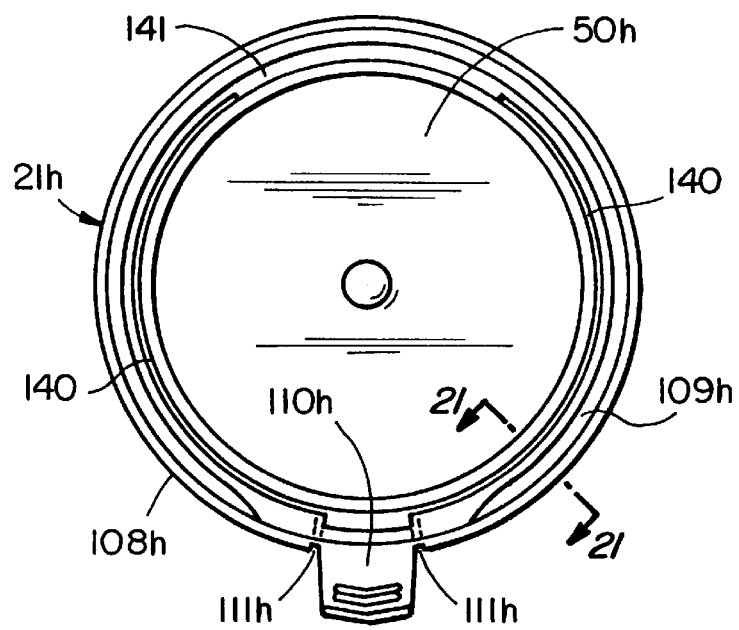
FIG_20
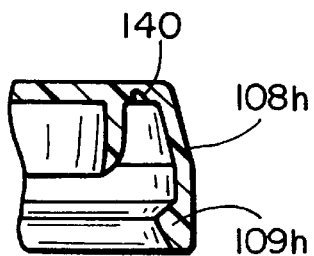
FIG_21

TAMPER-EVIDENT CLOSURES AND CONTAINER NECK THEREFOR

CROSS-REFERENCE TO RELATED APPLICATIONS

This application is a continuation in part of U.S. application Ser. No. 08/329,210, filed Oct. 26, 1994, to issue as U.S. Pat. No. 5,630,520 on May 20, 1997, which is a continuation-in-part of U.S. application Ser. No. 08/029,177, filed Mar. 10, 1993, now U.S. Pat. No. 5,456,376, which is a continuation-in-part of U.S. application Ser. No. 07/830,133, filed Jan. 31, 1992, now U.S. Pat. No. 5,267,661, which is a continuation-in-part of U.S. application Ser. No. 07/772,945, filed Oct. 8, 1991, now U.S. Pat. No. 5,213,224, which is a continuation-in-part of U.S. application Ser. No. 07/565,638, filed Aug. 9, 1990, now U.S. Pat. No. 5,190,178. The disclosures of the abovementioned applications are hereby incorporated herein by reference.

BACKGROUND OF THE INVENTION

1. Field of the Invention

The present invention relates in general to a tamper-evident closure system for sealing a container. More particularly, the present invention relates to a an improved neck finish and a closure with a reinforced tear tab.

2. Description of the Related Art

Many tamper-evident closure structures available in the prior art have a removable portion or lower skirt frangibly attached to the upper skirt of the cap. The removable portion typically includes a locking structure, such as ratchet teeth or beads, which cooperate with the locking structure on the neck to prevent removal of the closure so long as the removable portion is intact. A tear tab depending from the lower skirt may be gripped by a user to separate the removable portion from the remainder of the cap when opening the container. The removable portion may be formed with a vertical line of weakness adjacent the tear tab to facilitate opening of the container. A vertical rib may be formed on the back surface of the tab to ensure that the removable portion ruptures along the vertical line of weakness when a user grips the tab and pulls it away from the container neck.

Another type of closure, shown for example in U.S. Pat. Nos. 5,224,616 and 5,284,265, generally includes a top, a skirt depending from and frangibly joined to the top, and a tab joined to the skirt to facilitate removal of the skirt from the top. The interior of the skirt includes a retainer such as a rib or bead which engages a retainer formed on the exterior of the neck to retain the closure on the neck.

Depending upon the material used to manufacture the cap, the tear tab may be quite flexible. During shipment and storage of the cap, the standard tear tab may tend to bend under the weight of the cap and, after a period of time, may become set in the bent position. The deformed tab may interfere with the capping process and require that the cap be discarded. In some capping processes, the tear tab may be used to orient the cap relative to the neck. As the cap travels down a chute, the tab extends into a gap between parallel rails to position the cap so that it is discharged from the chute in a pre-determined orientation. A tab which has been bent inwardly may fail to engage the parallel rails of the chute, with the cap then having any orientation on discharge from the chute. As a result, many of the advantages of providing the cap with a predetermined orientation may be lost. Also, inward or outward bending of the tabs may cause difficulties in properly conveying the closures during the capping process.

A cap having a tab with sufficient rigidity to retain its original shape would avoid these problems occasionally encountered during capping processes. Moreover, a reinforced tab would assist the user in removing the lower skirt from the cap when opening the container. Many types of closures, including for example snap-on, snap-off structures and snap-on, screw-off structures, would benefit from the use of a reinforced tab.

The snap-on, screw-off structures available in the prior art are of two general types—those having thread engagement as initially applied, and those without initial thread engagement. Systems having partial to fill thread engagement on initial application have several advantages over the no-thread system, including the ability to effectively use a liner to seal the neck of the container. The height of the cap and the inner plug, if used, may be reduced. Consumer confusion is also eliminated, since the cap is initially removed from the container by twisting. However, the initial thread engagement systems do not offer the manufacturing and application advantages available with the no-thread system. With some systems, the capping machinery used to apply the closure must twist the closure relative to the container at some point during the application process in order to seat the cap on the neck. An example of such a closure is shown in U.S. Pat. No. 4,625,875 to Carr. Achieving full thread engagement without the use of complicated machinery to twist the cap relative to the neck is preferred.

One modification of this invention provides a snap-on, screw-off system with initial thread engagement by reason of a unique thread design, a unique tamper-evident band and optional means for orienting the closure and container threads to achieve registration prior to straight axial application. The neck is constructed to cooperate with either the standard or reinforced tear tab of a closure to ensure that the cap is aligned with the neck for full thread engagement. The neck construction offers the additional advantage of enabling a consumer to easily grip the tab and open the container. The present invention offers considerable advantages over prior structures as is evident from the description of the related art and the following description of the invention.

SUMMARY OF INVENTION

The present invention comprises an improved closure or cap and an improved neck finish. The cap skirt and neck finish are of the type having cooperatively shaped engagement structures, such as mating threads, one or more locking beads, etc., which hold the cap on the neck. A tamper-evidencing portion of the neck interengages a tamper-evidencing portion of the cap to prevent removal of the closure with the tamper-evidencing portions intact, providing evidence of tampering with the contents of the container.

The closure includes a tear tab which may be used to remove the tamper-evidencing portion from the cap skirt. A vertically extending bend increases the rigidity of the tab so that the tab will retain its original shape. The reinforced tab is easier to grip and, if the closure is oriented relative to the neck, assists in aligning the closure with the neck. The tamper-evidencing portion on the cap preferably includes a line of weakness adjacent the tear tab. A consumer removes the tamper-evidencing portion from the closure by pulling the tab and rupturing the line of weakness and the frangible section between the cap skirt and the tamper-evidencing portion. Since the tamper-evidencing portion is at least partially removed from the closure, tampering with the contents of the container may be detected by even the inattentive consumer.

If the cap skirt and neck finish are formed with mating threads, the threads may be of such shape that the cap may be applied in a simple downward vertical movement without relative rotation, the cap skirt flexing sufficiently to permit the threads to slip past each other. The interengagement of the threads requires that the closure be unscrewed for removal from the container. The closure may be formed having an orientation structure, such as the tear tab, for aligning the closure relative to the container. Similarly, the container may include an orientation structure, such as a non-circular cross section, for orienting the container with respect to the closure. The orientation features may be used to achieve complete thread engagement during straight axial application. Achieving full thread engagement allows use of lined closures for extra seal security or reduction in seal plug and closure height.

The improved neck finish has at least one notch shaped and positioned to receive the tear tab of a cap when the cap is seated on the neck. The neck may be used with a cap having a reinforced tab or the standard tear tab known in the art. If the tab is not completely aligned with the notch, the tab may be biased into the notch as the cap is moved downwardly onto the neck so that the cap and neck are fully aligned. A tab positioned in the notch is also easy to grip and pull away from the neck. A cap having a reinforced tab offers the advantage that the increased rigidity of the reinforced tab facilitates adjustment of the cap relative to the neck. The improved neck finish and the closure tear tab provide for full thread engagement when the snap-on, screw-off closure is moved downward onto the neck.

This invention also includes a cap having a top which covers the opening of the container neck and a skirt depending from the top. The skirt has at least one retainer formed on the interior thereof which engages a retainer formed on the exterior of the neck to retain the cap on the neck. A tab is joined to the top and skirt to facilitate removal of the closure from the neck. At least one frangible section is formed vicinal the tab such that when the consumer grips the tab to open the container, the frangible section is torn and interengagement between the retainers on the skirt interior and neck exterior is at least partially released. This closure may also be used with a neck having a sealing surface free of mold parting lines and a v-shaped stretch above the sealing surface, such that engagement member on the interior of the skirt engages the v-shaped stretch of the neck.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 11 is a side elevational view of another embodiment of a cap.

FIG. 12 is a top plan view of the cap of FIG. 11.

FIG. 13 is an enlarged sectional view taken substantially along line 13—13 in FIG. 12.

FIG. 14 is an enlarged fragmentary sectional view of the cap of FIG. 11 applied to a neck.

FIG. 15 is an enlarged sectional view taken substantially along line 15—15 in FIG. 13.

FIGS. 16 and 17 are enlarged sectional views similar to FIG. 15 showing tabs of other embodiments of invention.

FIG. 18 is a front plan view, partially broken away, of another embodiment of a neck.

FIG. 19 is an enlarged fragmentary sectional view showing the cap of FIG. 11 applied to the neck.

FIG. 20 is a bottom plan view of an another embodiment of a cap.

FIG. 21 is an enlarged sectional view taken substantially along line 21—21 of FIG. 20.

DETAILED DESCRIPTION OF THE PREFERRED EMBODIMENTS

Figure 1:
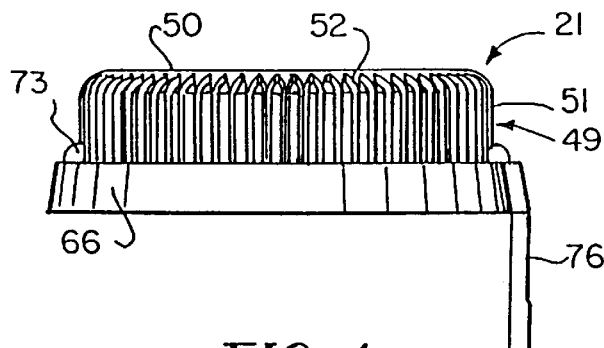
FIG. 1 is a side elevational view of a cap.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Directing attention to FIGS. 1–8, closure 21, hereinafter described in detail, is used with a container neck 22. Neck 22 has a central opening 23 surrounded by a lip 24. It should be understood that the term "lip" used herein refers to the edge of the neck around the opening, which may be in the form of an annular rim, a flange, or any other shape known in the art. In the embodiment shown in FIGS. 1–8, lip 24 is in the shape of a downward/outward slanted lip flange. A neck stretch 28 depends from the lip 24 and terminates in a horizontal upper shoulder 27. The interior of the neck 22 shown in FIGS. 6–8 forms no part of the present invention. When neck 22 is formed with an extrusion blow-molded finish, the interior contour of the neck tends to follow that of the exterior. Other types of bottles may be used, in which case the shape of the neck interior may vary from the exterior contour of the neck.

The exterior of neck stretch 28 includes at least one first engagement member as for example threads 30. In the modification shown in FIGS. 1–8, two continuous threads designated 30a and 30b extend helically around the exterior of the neck stretch. The finish has twelve threads per inch with a double lead, each thread being six pitch and extending slightly in excess of 360° of a full thread. The extent of the threads may be greater than 360° for increased thread engagement. Moreover, the finish may be provided with additional thread leads or a different linear thread density (threads per inch). The threads may be interrupted instead of continuous. Alternatively, other engagement members such as one or more locking beads or a groove formed in the neck stretch exterior may be substituted for the threads 30a and 30b.

Figure 6:
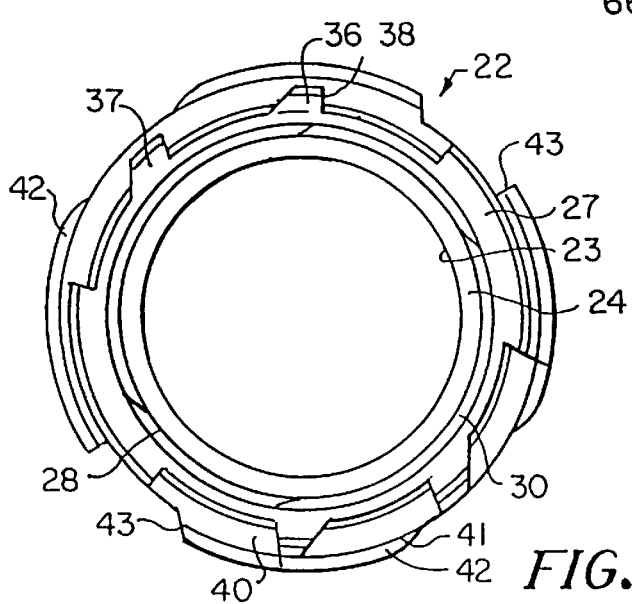
FIG. 6 is an enlarged top plan view of a neck.
Figure 7:
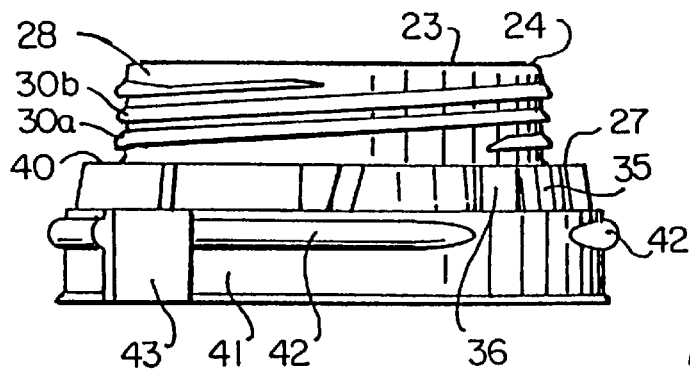
FIG. 7 is a side elevational view of a neck.
Figure 8:
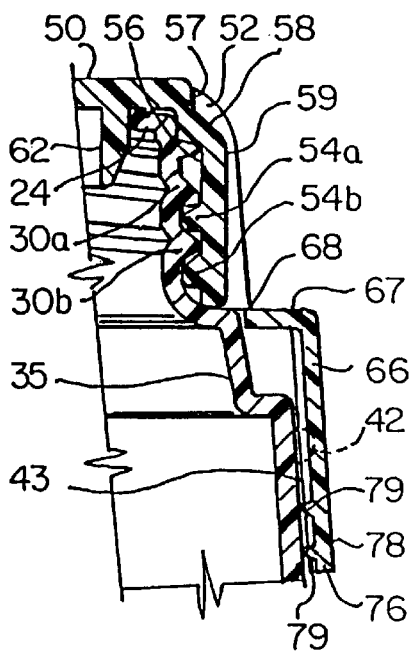
FIG. 8 is an enlarged fragmentary sectional view of the cap applied to the neck.

Neck 22 includes tamper-evidencing means which cooperate with tamper-evidencing means on the cap 21, hereinafter described, to provide evidence indicating whether a container has been previously opened. The cooperatively formed tamper-evidencing means alert a consumer to potential tampering with and/or contamination of the contents of the container. A locking wall 35 below the shoulder 27 is formed with at least one external tooth 36. As shown in FIGS. 6–8, neck 22 includes two groups of three teeth disposed on opposite sides of the container. However, the number of teeth may be increased or decreased and the grouping of the teeth may be modified. The locking wall 35 and the outer surface of teeth 36 slant downward/outward at an angle of approximately 10°. Each tooth 36 has a top surface 37 which may be co-planar with the surface of shoulder 27. The front edges 38 of teeth 36 are disposed at varying angles from about 45° to about 0° relative to a radial line drawn perpendicular to the vertical axis of the neck 22.

The locking wall 35 terminates in a generally horizontal lower shoulder 40. A lower vertical stretch 41 depending from the lower shoulder 40 merges with the container. Several bumper ring segments 42 are formed on the vertical stretch 41 to facilitate gripping of the container during filling and loading, and to provide the neck with a certain amount of vertical strengthening during capping.

Where appropriate two vertical notches 43 can be formed in vertical stretch 41 on opposite sides of the neck 22. The notches 43 are positioned to receive the tear tab of a cap when the cap is seated on the neck. This feature may be of particular advantage when neck 22 is used with a snap-on, twist off type of cap, examples of which are shown in U.S. Pat. Nos. 5,190,178, 5,213,224, and 5,267,661. Preferably, the tear tab is positioned in the notch before the closure threads engage the threads on the neck, facilitating orientation of the cap relative to the neck. Orienting a snap-on, twist-off closure relative to the neck ensures that optimal thread engagement is achieved during straight axial application of the cap to the neck. Optimal or full thread engagement promotes cap retention and seal security. In addition, the height of the closure and inner seal plug, if present, may be reduced. The locking means on the neck and cap, such as teeth 36 and complementary teeth formed on the closure interior, are similarly fully interengaged. The notches 43 offer the additional advantages of enabling the consumer to easily grip the tab to initially open the container. Although the neck shown in FIGS. 6–8 has two diametrically opposed notches, it should be understood that forming only one or more than two notches in vertical stretch 41 is within the scope of the present invention.

Cap 21, shown particularly in FIGS. 1 to 5, has a top 50 and a skirt 49 depending from the peripheral edge of the top. While the top 50 of the depicted embodiment is in the form of a generally flat disc, the top may also have other shapes. The skirt 49 includes an upper skirt 51 with a plurality of spaced vertical ribs 52 around the skirt exterior which enable the user to easily grip and remove cap 21 from the container.

The upper skirt interior includes at least one second engagement member, such threads 54, shaped to engage the first engagement members or threads 30 on the exterior of the neck stretch 28. Two continuous threads 54a and 54b extend helically around the interior of the upper skirt in the depicted embodiment. The threads 54a and 54b are double lead and each extend in excess of 180° (i.e. 200°) of the interior circumference of the cap. In other forms of the invention, the cap 21 may have additional thread leads or a different linear thread density (threads per inch). The threads may be interrupted instead of continuous or the threads 54a and 54b may be replaced by other engagement members such as a groove formed to interengage threads 30 on the neck.

Figure 4:
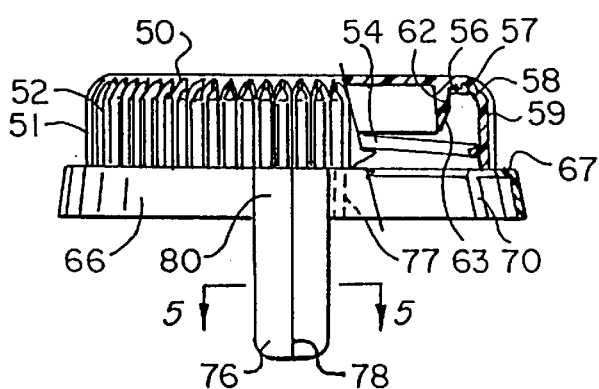
FIG. 4 is a side elevational view of the cap, the cap being partially broken away in section to reveal internal construction.
Figure 3:
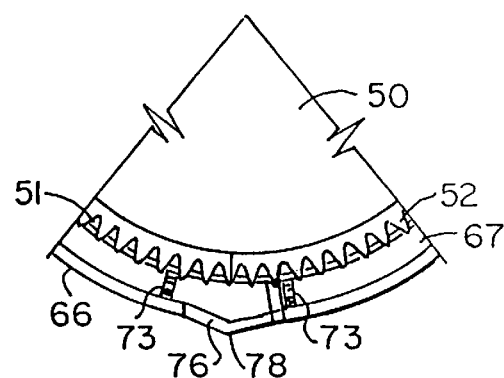
FIG. 3 is a fragmentary enlarged top plan view of the cap.

An inward projecting portion 56 of upper skirt 51 defines the minimum interior circumference of the cap. Preferably, the minimum interior circumference of the cap is less than the exterior circumference of the neck stretch 28 to form a tight fit between the interior of the upper skirt 51 and the exterior of neck stretch 28. As shown in FIG. 4, upper skirt 51 includes an upper stretch 57, a downward/outward slanted stretch 58 and a lower stretch 59. An internal shoulder formed at the intersection of upper stretch 57 and slanted stretch 58 defines the inward projecting portion 56. When the cap is applied, the inward projecting portion contacts the upper edge of the neck stretch 28 and biases the upper stretch 57 outward, stretching the top 50 of the cap and forming a tight fit between the upper skirt 51 and the neck stretch 28. Although not shown, the internal shoulder may be replaced by a bead or other projection on the interior of the cap.

A plug or inner skirt 62 depends from the underside of the top 50. The plug 62 is spaced inwardly from the upper skirt 51 to fit inside the neck opening 23. The outer bottom edge of the plug 62 is preferably formed with a bevel 63 to facilitate seating of the cap 21 on the neck. The plug 62 is pulled against the interior edge of the lip 24 as the cap 21 seats on the neck and the neck stretch 28 biases the upper stretch 57 outward. With a blow molded finish, neck opening 23 is formed using a blow mold pin which provides the interior edge of the lip 24 with a seamless surface. Since the exterior edge of the plug 62 is also seamless, pulling the plug against the interior edge of the lip forms a substantially liquid impervious seal between the cap 21 and the neck 22.

The cooperation between inward projecting portion 56, the plug 62 and the interior edge of lip 24 provides the closure system with a substantially leak tight seal. The seal between the plug exterior and the lip is of particular interest when the neck has a blow molded finish. However, it should be understood that various other sealing means may be used to seal the container.

Figure 2:
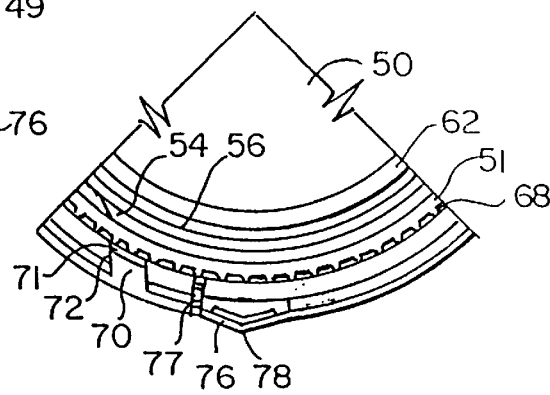
FIG. 2 is a fragmentary enlarged bottom plan view of the cap.

Cap 21 includes tamper-evidencing means which provides an indication that the cap has been previously removed from the container. In the embodiment shown in FIGS. 1–8, the cap skirt 49 includes a removable portion or lower skirt 66. The lower skirt 66 is frangibly joined to the upper skirt 51 by a plurality of bridges 68. As shown in FIGS. 2 and 4, the bridges constitute the lower edges of ribs 52. Depending upon the strength and number of frangible connections or bridges 66 incorporated in the cap, the bridges may prevent removal of the cap without separating the lower skirt 66 from the upper skirt 51, or the bridges may rupture when one attempts to initially remove the closure 21 from the neck 22. With the first alternative, the absence of lower skirt 66 indicates that the container has been opened, while with the second alternative the ruptured bridges provide evidence that the container had been opened.

Lower skirt 66 includes an inward extending shoulder 67 frangibly connected to upper skirt 51 by the bridges 68. The shoulder substantially prevents the accumulation of foreign particles between the lower skirt and locking wall 35 of the neck. However, in other modifications of the closure system the lower skirt may take on other shapes. For example, the lower skirt may have a generally planar cross section. The bridges and the voids therebetween are sometimes referred to herein as "horizontal lines of weakness." Instead of the bridges 68 interconnecting the upper and lower skirts 51 and 66, cap 21 may include other frangible means such as a continuous thinned tear line around the circumference of the cap. One advantage of using the frangible connections or bridges is that cap 21 may be fabricated from a wide range of materials.

The interior of lower skirt 66 includes locking means which cooperate with the locking means on the neck to prevent removal of the cap without separation of the lower skirt from upper skirt 51. One such locking means is provided by internal teeth 70 shaped and positioned to engage the external teeth 36 on neck 22. After application of the cap, the inner edges 71 of the teeth 70 are positioned close to locking wall 35. The leading edges 72 of teeth 70 are each formed at an angle of approximately 45 to a radial line, thereby ensuring good interlock with the complementary surface 38 of teeth 36 on the neck. The angular relationship between teeth 36 and teeth 70 biases the cap 21 into a more secure locking arrangement with the neck 22.

Vertical fins 73 are formed between the shoulder 67 and upper skirt 51 to provide further protection against tampering with the container. The fins 73 prevent the upward deformation of the lower skirt 66. If an attempt is made to pry the lower skirt upward, the fins ensure that bridges 68 rupture, providing evidence of potential tampering.

Tear tab 76 joined to lower skirt 66 provides means for removing the lower skirt from cap 21. Tab 76 extends downwardly from the lower edge of lower skirt 66 and is preferably positioned adjacent a vertically extending weakened line 77 in lower skirt 66. The weakened line 77 may be provided by a continuous thin tear line extending through the lower skirt, as shown in FIG. 2, or the weakened line 77 may alternatively be formed using other frangible means known in the art. Although use of the weakened line is optional, splitting the lower skirt when the cap is initially removed offers several advantages. Removing the lower skirt from around the neck provides clearly visible evidence that the container has been previously opened. The weakened line 77 facilitates separation of the lower skirt from the upper skirt and splitting lower skirt 66 eliminates the dangers an intact band may present to wildlife.

Figure 5:
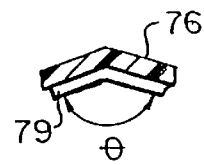
FIG. 5 is an enlarged, fragmentary sectional view taken along line 5—5 of FIG. 4.

As shown particularly in FIGS. 4 and 5, tab 76 has a vertically extending bend 78. Bend 78 reinforces and increases the rigidity of the tab 76. Because of the reinforcement provided by bend 78, the tab will substantially resist deformation during packing and shipment so that the cap may be applied to the neck 22 without difficulty. The shape and rigidity of tab 76 enable a user to more easily grip the tab and remove lower skirt 66. If the cap 21 is oriented relative to the container before application, the reinforced tab 76 facilitates the orientation of the cap. By forming the tab with bend 78, tab 76 thereby offers several advantages over the standard tab. In the depicted embodiment, the angle of bend 78 is approximately 145, although the size of the angle may be increased or decreased. For example, a bend having an angle within the range of approximately 90 to 170 is within the scope of the present invention. Bend 78 may be angular as shown, providing tab 76 with an arrow-shaped cross section, or it may be rounded or curved. The apex of the bend 78 is preferably positioned on the exterior of the cap, although if desired the bend apex may be on the interior of the cap.

The underside of tab 76 is formed with a pair of vertically spaced, transverse ribs 79. The ribs 79, which have the same shape as tab 76, improve the ability of a user to grip the tab. The ribs 79 also raise the lower end of the tab from the neck exterior so that a user may slip a fingernail below the tab and easily lift the tab from the neck. As shown particularly in FIG. 4, lower skirt 66 has a bent portion 80 coinciding with and extending vertically from bend 78 of the tab. Bent portion 80 generally follows the shape and contour of the bend 78 in the tab. Forming the lower skirt with bent portion 80 is optional, although it facilitates the formation of cap 21 and improves the overall aesthetic appearance of the cap.

When used with neck 22 of the embodiment shown in FIGS. 6–8, the reinforced tab cooperates with the neck to ensure that the cap is fully seated on the neck. As shown in FIG. 8, tab 76 is positioned in one of the notches 43 when cap 21 is seated on neck 22. If tab 76 is not fully aligned with a notch 43, the rigid tab may contact bumper ring segment 42, causing the cap to rotate slightly so that the tab is directed into the notch 43. In addition, the placement of tab 76 in notch 43 assists the user in gripping the tab 76 for removal of lower skirt 66.

Figure 9:
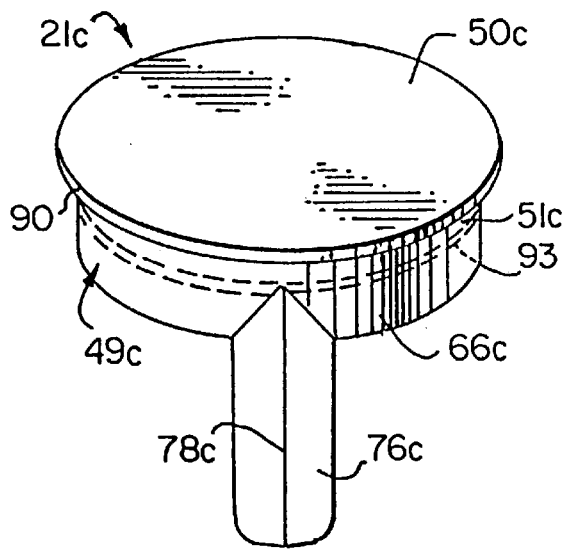
FIG. 9 is an isometric view of an alternative embodiment of a cap.
Figure 10:
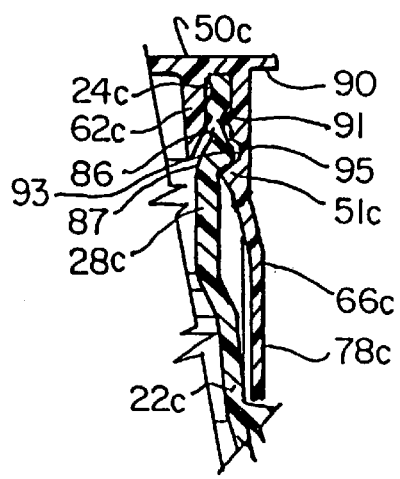
FIG. 10 is an enlarged fragmentary sectional view of the cap of FIG. 9 applied to a neck.

Another modification of the cap and neck are shown in FIGS. 9 and 10. Several elements, which are substantially similar to those of the previously described embodiment, are identified by the original reference numeral and "c". Cap 21c is applied to a standard neck 22c having a lip 24c and a neck stretch 28c below the lip. The neck stretch 28c is formed with a shoulder 86 and an external bead 87 provides the engagement member on the neck stretch 28c.

Cap 21c has a top 50c, a skirt 49c with an upper skirt portion 51c depending from the top, and an inner skirt or plug 62c spaced inwardly from the upper skirt 51c. A thin, flexible peripheral flange 90 on the top 50c may be used to pull the cap off the neck. The flexibility of the flange 90 prevents removal of the cap 21c with the tamper-evidencing means of the cap still intact. The interior of upper skirt portion 51c includes an engagement member, such as an internal locking bead 91, for retaining the cap on the neck. The locking bead 91 may be interrupted or continuous, although interruptions in the beads are preferred as they permit the upper skirt to stretch during application of the cap. When the cap is seated on the neck 22c, the bead 91 is seated beneath the shoulder 86 on the neck.

Cap 21c includes tamper-evidencing means as for example a removable lower skirt portion 66c. An internal bead 93 on the interior of the lower skirt portion 66c engages the external bead 87 on the neck to prevent removal of the cap with the lower skirt intact. An internal horizontal scoreline 95 frangibly connects the removable portion 66c to upper skirt portion 51 c. The scoreline 95 may be provided by a continuous thinned tear line around the circumference of the cap or other frangible means known in the art may be used to form the horizontal scoreline 95. The lower skirt portion 66c may be separated from the upper skirt portion 51c by tearing along the scoreline 95 as is known in the art.

A reinforced tear tab 76c with a vertically extending bend 78c depends from the lower edge of lower skirt portion 66c. The tab 76c may be used to pull the lower skirt 66c from the upper skirt 51c. As was described in relation to the previous modification, bend 78c increases the rigidity of the tab 76c to ensure that the tab retains its original shape and to improve the effectiveness of the tab in assisting with the removal of lower skirt portion 66c.

The cap 21c is moved in a downward axial direction to seat the cap on the neck 22c. The upper skirt 51c and the lower skirt 66c stretch as the cap is seated on the neck, allowing locking bead 91 to slip beneath shoulder 86 and locking bead 93 to slip past external locking bead 87. Until lower skirt portion 66c is at least partially separated from the upper skirt, the cap 21c may not be removed from the neck 22c without deforming the neck. Thus, tampering with the contents of the container may easily be detected.

FIGS. 11–15 show another embodiment of a cap 21d and neck 22d in accordance with the present invention. Turning particularly to FIGS. 11 and 14, the neck 22d generally includes a lip 24d and a neck stretch 28d depending therefrom. In this embodiment, the engagement member on the neck stretch 28d is an annular bead 100 having an outwardly-downwardly slanted upper surface 101 and an inwardly extending lower surface 102. Instead of the bead 100, other engagement members may be used such as a plurality of beads, threads, or grooves shaped to cooperate with the engagement member on the cap to retain the cap on the neck. The neck stretch 28d terminates in a shoulder 103 which extends outwardly to the lower vertical stretch 41d. In the illustrated modification, the shoulder 103 is substantially horizontal, although it is to be understood that the shoulder may be slanted upwardly or downwardly in other modifications of the invention. Unlike the necks 22 and 22c of the previous embodiment, the neck 22d shown particularly in FIGS. 11 and 14 does not include a locking wall 35, 35c.

Turning particularly to FIGS. 11–13, the cap 21d generally includes a top 50d, an inner plug 62d depending from the underside of the top 50d and engaging the lip 24d, and a skirt 108 depending from the peripheral edge of the top 50d. The engagement members provided on the interior of the skirt 108 are two circumferentially spaced beads 109 shaped and positioned to engage the lower surface 102 of the bead 100 on the exterior of the neck stretch 28d. In the illustrated embodiment, the beads have an arcuate extent of about 100° to 110° around the circumference of the cap and are separated by interrupted sections having an arcuate extent of about 70° to 80°. However, it is to be understood that the arcuate extent of the beads is subject to variation within the scope of the present invention. With beads 109 of this embodiment, the skirt 108 is allowed to stretch slightly in the interrupted sections as the beads 109 slide along the upper surface 101 of the bead 100 to facilitate application of the cap 21d onto the neck 22d. It is to be understood that the arcuate extent of the beads 109 as well as the number of beads 109 may be increased or decreased if desired. Instead of a bead, other engagement members may be used such as one or more threads or one or more grooves formed to cooperate with the engagement member on the neck to retain the closure on the container. As is shown particularly in FIG. 11, the beads 109 are positioned at the lower edge of the skirt 108, minimizing the height of the skirt as well as the amount of material used to manufacture the cap 21d. In other embodiments of the invention, the cap skirt may extend below the engagement members formed on the skirt interior.

When the cap 21d is seated on the neck 22d, the inner plug 62d engages the neck to form a seal. The plug 62d may seal against both the lip 24d and the inner surface 104 as shown in FIG. 14. However, it is to be understood that the plug 62d may seal with the neck in only one location, engaging for example either the lip 24d or the inner surface 104. The beads 109 snap under and engage the bead 100 on the neck stretch 28d. The lower edge of the skirt 108 engages or is positioned vicinal the shoulder 103. Minimizing or even eliminating the gap between the lower edge of the skirt 108 and the shoulder 103 prevents the insertion of a finger nail or other implement in an attempt to pry the cap from the container with the skirt 108 intact.

As with the neck 22d, the closure 21d differs from the closures 21 and 21c of the previous embodiment in that the cap does not include a lower skirt 66, 66c frangibly attached to the skirt 108. In this embodiment, the cap skirt 108 is a tamper-evidencing feature which may be used to provide visual evidence that the container has been opened.

The cap 21d includes a reinforced tab 110 joined to the peripheral edge of the top 50d. The tab 110 extends through the cap skirt 108, completing the circumference of the skirt 108, and depends from the lower edge of the skirt 108. The tab 10 is joined to the skirt 108 by at least one frangible section 111 vicinal the tab 110. In the illustrated embodiment, both side edges of the tab 110 are joined to the skirt 108 by frangible sections. The cap 21d may be removed from the neck 22d by pulling upwardly on the tab 110 and at least partially fracturing one or both frangible sections 111. When the frangible sections 111 rupture, the skirt 108 is released and allowed to expand outwardly and the engagement between the beads 109 and the bead 100 is loosened or even released such that the cap 21d may be easily lifted from the container neck 22d by pulling upwardly on the tab. If desired, the inner surface of the tab 11 0 may be provided with one or more transverse ribs 112 to assist the user in gripping the tab 110.

As with the previous embodiments, the tab 110 is reinforced to withstand the force required to separate the tab 110 from the skirt 108 and lift the top 50d from the container neck. As is shown particularly in FIG. 15, reinforced tab 110 has a bent configuration, with the walls 116 extending outwardly from the longitudinal axis 117 of the tab and terminating in side edges 118 positioned in a plane spaced from the longitudinal axis 117 of the tab. The bent configuration of the tab 110 reinforces and increases the rigidity of the tab 110 so that the tab may be easily separated from the skirt 108. In addition, the rigidity of the tab substantially resists deformation during packaging, shipment and application of the cap 21d to the neck 22d. In the modification of the tab 110 shown particularly in FIG. 15, the outward extending walls 116 are oriented relative to one another at an angle θ of about 155° to 160°. The relative positions of the walls 116 may be adjusted to an angle θ in the range of 90° to 170°. The tab shown in FIG. 15 has a substantially uniform cross-sectional thickness, providing the tab with an arrow-shaped cross section. However, it is to be understood that the shape of tab 110 is not limited to this arrow-shaped configuration. FIG. 16 shows a modified tab 110e which includes a substantially planar inner surface 122 extending between the side edges 118e to provide the tab 110e with a solid triangular-shaped cross section. Another modified tab 110f is shown in FIG. 17. With tab 110f, the walls 116f are curved from the longitudinal axis 117f to the side edges 118f providing the tab 110f with a generally concave cross-sectional shape. As with the tab 110e shown in FIG. 16, the tab 110f of FIG. 17 may be modified to include a planar inner surface (not shown) joining the side edges 118f. With the tabs 110, 110e and 110f of this invention, the longitudinally extending bend reinforces and increases the rigidity of the tab.

In the embodiment shown particularly in FIGS. 11–15, the cap 21d may not be securely retained on the neck 22d once the frangible sections 111 are ruptured. This feature is different from the previous embodiments, where the cap 21, 21c may be used to securely re-close the container after the container has been initially opened by the consumer. If desired, the top 50d may be placed on the neck with the plug 62d inserted into the opening of the neck to seal the container. The friction fit between the plug 62d and the lip 24d holds the top 50d in place.

FIGS. 18 and 19 show a modified neck 22g which may be used with the cap of FIGS. 11–15. The neck 22g is of the type disclosed in co-pending application U.S. Ser. Nos.

08/385,808 and PCT Application No. PCT/US96/00639 (now U.S. Ser. No. 08/894,189 filed Jul. 29, 1997), the disclosures of which are incorporated herein by reference. In general, the neck 22g has a primary seal surface 128 which is very smooth and is distinguished by the absence of parting lines inasmuch as it is formed by air pressure or other mechanical means during the blow molding process and is not formed by the mold halves and thus does not have a mold parting line formed therein. This seal surface 128 may be vertical or it may be curved. Further, the primary sealing surface has minimal ovality, by reason of the way it is formed. Above surface 128 the neck structure extends outwardly in a outward stretch 129 which terminates in an upward bend 130. Above bend 130 is a thin, tapered upward-inward extending flange 131, the inner edge of which is of greater diameter than the diameter of surface 128. The outward extending stretch 129, bend 130, and flange 131 define a v-shaped stretch of the neck wall. Below surface 128 the neck extends downwardly-outwardly in a slanted stretch 134 which terminates in a lower neck stretch 135. Lower neck stretch 135 joins the slanted stretch 134 to the body of the container (not shown) and may be formed to facilitate in handling of the container during the capping process.

In accordance with one form of standard blow molding practice, a parison of the plastic material from which the container is to be formed is deposited in the split mold. Air is blown into the parison to expand it to fill the mold. In this form of the present invention, the mold has an insert which is shaped complementary to the finish of the neck of the container heretofore described and above the neck insert the mold widens out to establish what is known as a blow dome of excess material. The blow dome, generally designated 136, is severed from the neck finish by well-known means. In accordance with one form of the present invention, as distinguished from prior neck finishes, the blow dome is severed at the inner edge of flange 131 by trimming. The cut line 137 is a circle along which the stretch blow dome 136 is severed from the inner edge of flange 131. By reason of the almost 180° bend 130 and the rapid diameter changes within a relatively short vertical distance, flange 131 is thin and flexible. It will be understood that the type plastic used to mold neck 22g may be any suitable relatively hard plastic such as polyethylene.

One of the advantages of the present invention is that the edge at which the blow dome is severed is not the primary sealing surface 128. As is shown particularly in FIG. 19, the exterior of the plug 62g of the cap 21g seals against the inner surface 128. Since the surface 128 is very smooth, a very effective seal is formed between the plug 62g and the surface 128. Severing the edge of the neck from the blow dome may cause a rough surface. However, since the very smooth surface 128 causes a tight seal against the exterior of inner plug 62g, the flange 131 need not seal against the plug 62g at all. In other neck finishes, the cut inner edge of the flange is a primary seal.

In the embodiment of FIGS. 18 and 19, the engagement member on the neck is provided by the v-shaped stretch defined by the outward stretch 129, bend 130 and flange 131. The v-shaped stretch, exterior of surface 128 and slanted stretch 134 are shaped such that when the cap 21g is applied, the beads 109g engage the outward stretch 129 to retain the cap 21g on the neck 22g. As the cap 21g is pushed onto the neck 22g, the beads 109g slide across the flange 131 causing the skirt 108g to expand sufficiently outward to permit the apex of the beads 109g to slip past the bend 130. The generally horizontal inclination of the outward stretch 129 substantially resists upward movement of the beads 109g past the bend 130 so long as the frangible sections 111g are intact. The cap 21g may be removed by lifting upwardly on the tab 110g to cause one or both frangible sections 111g to rupture, separating the tab 110g from the skirt 108g.

FIGS. 20 and 21 show another embodiment of the closure shown in FIGS. 11–15. The cap 21h generally includes a top 50h, a reinforced tab 110h joined to the top 50h, and a skirt 108h joined to the top 50h and the tab 110h. In this embodiment of the invention, the frangible sections 111h terminate in frangible sections 140 which extend circumferentially along the peripheral edge of the top 50h to frangibly join the skirt 108h to the top 50h. As is shown particularly in FIG. 20, the frangible sections 140 do not meet and provide a continuous tear line where the skirt 108h may be completely separated from the top 50h. Instead, the frangible sections 140 are separated by a solid stretch 141 where the skirt remains joined to the top 108h, ensuring the skirt 50h will be removed with the top 50h when the container is opened. If complete separation of the skirt from the top is desired, the cap 21h may include one frangible section 140 extending continuously from one side of the tab 10h to the other.

The cap 21h may be removed from the neck by pulling upwardly on the reinforced tab 110h to fracture frangible sections 111h. Continued lifting of the tab 110h causes the frangible sections 140 to rupture and the top 50h to be partially separated from the skirt. During this process, the beads 109h on the interior of the skirt are released from engagement with the bead 100h on the neck 22h and the top 50h and skirt 108h are easily lifted from the neck to open the container.

PREFERRED OPERATION

In a preferred form of the present invention, cap 21 is seated on neck 22 through the application of a direct axial downward force as follows. After the container has been filled, it is transported through a capping machine. The structure of capping machines is well known in the bottling art. As is well understood in the art, and in a manner similar to that whereby push-on, pull-off caps are applied, caps 21 are fed one at a time out of a bowl in the capping machine along a chute. One type of chute is formed with a space between parallel rails, with tear tab 76 orienting the caps for uniform discharge in a pre-determined orientation relative to the containers passing therebelow by fitting into the space between the rails. Preferably each container has a non-circular cross section, some other variation from a round shape, or some other orientation means which permits the container to be oriented relative to cap 21. The container travels along a conveyer belt below the capping machine. Guide rails adjacent the conveyor belt directionally align the non-circular cross section of the container relative to the tear tab 76 of the cap. Thus, the cap 21 and neck 22 may be conveniently oriented relative to one another by the conventional capping machine and conveyor belt system. Threads 30 and 54 are in vertical alignment, ensuring full thread engagement and complete interengagement of the teeth 36 and 70. In other modifications of the invention, the teeth 36 and 70 need not be vertically aligned.

An axially downward force is applied to the cap, pushing the cap onto the neck without externally imposed relative rotation of the cap and container. Threads 54a and 54b slip over threads 30a and 30b, the slanted surfaces of the neck threads facilitating such movement. The cap is sufficiently resilient so that it expands outward to permit the threads to slip. As cap 21 seats on the neck, teeth 70 fall behind teeth 36, providing interengagement between teeth 36 and teeth 70. After the cap has been fully seated on neck 22, it may not be removed without providing evidence of tampering. The interengagement between teeth 36 and 70 prevents unscrewing of the cap from the container, while the interengagement between the threads prevents lifting of cap 21 off neck 22.

The caps 21c, 21d, and 21h are also applied by applying a direct, downward force to push the cap 21c, 21d, 21h onto the neck 22c, 22d, 22g, 22h. With the cap 21c and neck 21d of FIGS. 8–10, the locking bead 91 slips beneath shoulder 86 and locking bead 93 slips past locking bead 87 during the downward movement of the cap 21c onto the neck 22c. The bead 91 and shoulder 86 and the beads 93 and 87 interengage to securely retain the cap 21c on the neck 22c. With the caps 21d and 21h, the beads 109, 109g, 109h or other engagement member slip past and engage the bead 100, 100h, bend 130 or other engagement member on the neck to securely retain the cap on the neck.

As is apparent from the foregoing discussion, the invention provides a tamper-evident closure system. The reinforced tab resists the bending or deformation which may occur during shipment and storage, ensuring that the cap may be satisfactorily applied to a container neck. If the cap is of the type which is positioned in a predetermined orientation prior to application, tab 76 facilitates orientation of the cap as it seats on the container neck. The reinforced tab allows a user to more easily grip the tab and remove the lower skirt 66 when opening the container. The notches 43 in the neck facilitate orientation of a snap-on, twist-off type of closure as it is seated on the neck.

In FIGS. 8–10, 11–15, 16, 17, 18–19 and 20–21 the same reference numerals are used for parts corresponding to those previously mentioned followed by subscripts c, d, e, f, g and h, respectively.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A closure for use with a neck of a container, the neck having an opening, a neck wall surrounding said opening, and at least one first engagement member on the neck, said closure comprising;

a top for covering the opening of the neck;

a tab joined to and depending from said top for removing said top from the neck to open the container, said tab in cross-section having a bent configuration and having an exterior having a longitudinal axis and wall portions extending outwardly from said axis and terminating in a plane spaced from the longitudinal axis for reinforcing said tab said tab extending substantially parallel to and in close proximity to said neck wall, and a skirt depending from said top and joined to said tab, said skirt having at least one second engagement member formed on the interior thereof and at least one frangible section vicinal said tab, said at least one second engagement member being shaped and positioned to engage the at least one first engagement member on the neck wall and prevent removal of said closure from the neck so long as said at least one frangible section is intact, said skirt being joined to said top by at least one arcuate, circumferentially extending frangible stretch extending at least partially around and in proximity to the juncture of said top with said skirt.

2. The closure of claim 1 in which said skirt is joined to said top by two circumferentially extending frangible stretches extending around the juncture of said top with said skirt, said frangible stretches being separated at one end by said tab and at the other end by a solid stretch of sufficient extent to prevent complete separation of said skirt from said top.

3. The closure of claim 1 in which said at least one second engagement member is provided by at least one bead formed on the interior of said skirt.

4. The closure of claim 1 in which said wall portions of said tab curve outwardly from the longitudinal axis of said tab to the plane spaced from the longitudinal axis.

5. The closure of claim 1, and further comprising an inner plug depending from the underside of said top and spaced inwardly of the interior of said skirt.

6. The closure of claim 1 in which each of said wall portions of said tab extend outwardly from the longitudinal axis in a plane, the planes of said wall portions intersecting at an angle at the longitudinal axis of said tab, said tab in transverse cross-section having a chevron shape.

7. The closure of claim 6 in which the angle between the planes of said wall portions is between approximately 90° and 170°.

8. The closure of claim 6 in which said tab has an inner surface substantially parallel to the exterior of said tab such that said tab has a substantially uniform thickness.

9. A closure for use with a neck of a container, the neck having an opening, a neck wall surrounding said opening, and at least one first engagement member on the neck, said closure comprising:

a top for covering the opening of the neck;

a tab joined to and depending from said top for removing said top from the neck to open the container, said tab having an exterior having a longitudinal axis and wall portions extending outwardly from said axis and terminating in a plane spaced from the longitudinal axis for reinforcing said tab; and a skirt depending from said top and joined to said tab, said skirt having at least one second engagement member formed on the interior thereof and at least one frangible section vicinal said tab, said at least one second engagement member being shaped and positioned to engage the at least one first engagement member on the neck wall and prevent removal of said closure from the neck so long as said at least one frangible section is intact, said skirt including two second engagement members spaced circumferentially around the interior of said skirt, each of said second engagement members being shaped and positioned to engage the at least one first engagement member on the neck to retain said closure on the neck so long as said at least one frangible section is intact.

10. A closure for use with a neck of a container, the neck having an opening, a neck wall surrounding said opening, and at least one first engagement member on the neck, said closure comprising:

a top for covering the opening of the neck;

a tab joined to and depending from said top for removing said top from the neck to open the container, said tab having an exterior having a longitudinal axis and wall portions extending outwardly from said axis and terminating in a plane spaced from the longitudinal axis for reinforcing said tab; and a skirt depending from said top and joined to said tab, said skirt having at least one second engagement member formed on the interior thereof and at least one frangible section vicinal said tab, said at least one second engagement member being shaped and positioned to engage the at least one first engagement member on the neck wall and prevent removal of said closure from the neck so long as said at least one frangible section is intact, said tab having a substantially planar inner surface providing said tab with a non-uniform thickness.

11. In combination, a neck of a container and a closure therefor, said neck having an opening, a neck wall surrounding said opening, and at least one first engagement member;

said closure having a top for covering said opening, a tab joined to and depending from said top for removing said top from said neck to open the container, said tab in cross-section having a bent configuration and having an exterior having a longitudinal axis and wall portions extending outwardly from the longitudinal axis and terminating in a plane spaced from the longitudinal axis for reinforcing said tab, sad tab extending substantially parallel to and in close proximity to said neck wall, and a skirt depending from said top and joined to said tab, said skirt having at least one second engagement member formed on the interior thereof and at least one frangible section vicinal said tab;

said at least one first engagement member and said at least one second engagement member interengaging to prevent removal of said closure from said neck so long as said at least one frangible section is intact, said skirt being joined to said top by at least one circumferentially extending frangible stretch sending at least partially around and in proximity to the juncture of said top with said skirt.

12. The combination of claim 11 in which said at least one first engagement member is provided by an annular rib formed on the exterior of said neck, said annular rib engaging said at least one first engagement member to secure said closure on said neck.

13. The combination of claim 11 in which said skirt includes two frangible sections positioned on opposite sides of said tab.

14. The combination of claim 11 in which said skirt is joined to said top by at least one circumferentially extending frangible stretch.

15. The combination of claim 11 in which said wall portions of said tab curve outwardly from the longitudinal axis of said tab to the plane spaced from the longitudinal axis.

16. The combination of claim 11 in which each of said wall portions of said tab extend outwardly from the longitudinal axis in a plane, the planes of said wall portions intersecting at an angle at the longitudinal axis of said tab.

17. The combination of claim 11 in which said tab has an inner surface substantially parallel to the exterior of said tab such that said tab has a substantially uniform thickness.

18. The combination of claim 11 in which said neck includes a sealing portion having a smooth, internal circumferential primary seal surface characterized by the absence of mold parting lines and a v-shaped stretch extending upwardly and outwardly from said sealing portion, said at least one first engagement member being provided by said v-shaped stretch.

19. The combination of claim 18 in which said v-shaped stretch terminates in a circumferential trim line, said trim line having a circumference no smaller than that of said seal surface.

20. The combination of claim 19 in which said closure includes an inner plug depending from the underside of said top, the exterior of said inner plug sealing against said primary seal surface.

21. In combination, a neck of a container and a closure therefor, said neck having an opening, a neck wall surrounding said opening, and at least one first engagement member;

said closure having a top for covering said opening, a tab joined to and depending from said top for removing said top from said neck to open the container, said tab having an exterior having a longitudinal axis and wall portions extending outwardly from the longitudinal axis and terminating in a plane spaced from the longitudinal axis for reinforcing said tab, and a skirt depending from said top and joined to said tab, said skirt having at least one second engagement member formed on the interior thereof and at least one frangible section vicinal said tab;

said at least one first engagement member and said at least one second engagement member interengaging to prevent removal of said closure from said neck so long as said at least one frangible section is intact, said tab having a substantially planar inner surface providing said tab with a non-uniform thickness.

22. In combination, a container neck and a closure therefor, said neck having an opening, a neck wall surrounding the opening, and at least one first engagement member on the neck;

said closure having a top covering said opening, a tab joined to and depending from said top for removing said top from said neck to open the container, said tab on cross-section having a bent configuration, said tab extending substantially parallel to and in close proximity to said neck wall, and a skirt depending from said top and joined to said tab, said skirt having at least one second engagement member formed on the interior thereof and at least one frangible section vicinal said tab;

said at least one first engagement member and said at least one second engagement member interengaging to prevent removal of said closure from the neck so long as said at least one frangible section is intact.

23. The combination of claim 22 in which said at least one first engagement member is provided by an annular rib formed on the exterior of said neck, said annular rib engaging said at least first engagement member to secure said closure on said neck.

24. The combination of claim 22 in which said neck includes a sealing portion having a smooth, internal circumferential primary seal surface characterized by the absence of mold parting lines and a v-shaped stretch extending upwardly and outwardly from said sealing portion, said at least one first engagement member being provided by said v-shaped stretch.

25. The combination of claim 22 in which said tab has an exterior having a longitudinal axis and wall portions extending outwardly from the longitudinal axis and terminating in a plane spaced from the longitudinal axis for reinforcing said tab.

26. The combination of claim 22 in which said closure includes an inner plug depending from said top and spaced from the interior of said skirt, said plug having an exterior surface engaging said neck wall.

* * * * *